US012061556B2

(12) United States Patent
Hsu et al.

(10) Patent No.: US 12,061,556 B2
(45) Date of Patent: Aug. 13, 2024

(54) HOT/COLD ADDRESS/DATA DETERMINATION USING HASH ADDRESSES FOR A DATA STORAGE SYSTEM

(71) Applicant: InnoGrit Corporation, San Jose, CA (US)

(72) Inventors: Yan-Ruey Hsu, Zhubei (TW); Yuan-Mao Chang, Hsinchu (TW); Wan-Ru Lin, New Taipei (TW)

(73) Assignee: InnoGrit Corporation, San Jose, CA (US)

( * ) Notice: Subject to any disclaimer, the term of this patent is extended or adjusted under 35 U.S.C. 154(b) by 19 days.

(21) Appl. No.: 17/942,224

(22) Filed: Sep. 12, 2022

(65) Prior Publication Data

US 2024/0086331 A1 Mar. 14, 2024

(51) Int. Cl.
*G06F 12/0891* (2016.01)
*G06F 12/0864* (2016.01)

(52) U.S. Cl.
CPC ...... *G06F 12/0891* (2013.01); *G06F 12/0864* (2013.01)

(58) Field of Classification Search
CPC .......................... G06F 12/0864; G06F 12/0891
See application file for complete search history.

(56) References Cited

U.S. PATENT DOCUMENTS 11,010,102 B2 5/2021 Garg et al.
2020/0393974 A1* 12/2020 Bahirat ................. G06F 3/0685
2023/0064745 A1* 3/2023 Dirik ....................... G06F 12/12

FOREIGN PATENT DOCUMENTS

CN 104991743 B 1/2018
CN 104850500 B 6/2019
CN 114969069 A 8/2022
TW I652570 B 3/2019

* cited by examiner

*Primary Examiner* — Aracelis Ruiz
(74) *Attorney, Agent, or Firm* — IPro, PLLC

(57) ABSTRACT

Systems, apparatus and methods are provided for determining whether data accessed by the command in a storage system is hot or cold. An apparatus may include a first interface to be coupled to a host and a storage controller configured to: receive a command that contains an address in a data storage system; generate a set of hash addresses for the address; for each hash address of the set of hash addresses: obtain a stored hotness score associated with the hash address, update the stored hotness score to generate an updated hotness score associated with the hash address, and determine that the updated hotness score is above a hotness threshold; and determine that the address is hot.

20 Claims, 5 Drawing Sheets

| COMMAND INDEX | 0 | 1 | ...... | 127 | 128 | ...... | 255 | .......... | 2047 |
|---|---|---|---|---|---|---|---|---|---|
| SEGMENT INDEX | 0 | | | | 1 | | | ...... | |
| EPOCH INDEX | 0 | | | | | | | | |

300

| EPOCH DIFFERENCE | 0 | 1 | 2 | ............ | 14 | 15 |
|---|---|---|---|---|---|---|
| DECAY FACTOR | 0 | 32 | 64 | ............ | 448 | 480 |

500

| SEGMENT DIFFERENCE | 0 | 1 | 2 | ........ | 14 | 15 |
|---|---|---|---|---|---|---|
| DECAY FACTOR | 0 | 2 | 4 | ........ | 28 | 30 |

600

900

<table>
<tr><th colspan="10">HOT LBAS RATIO</th></tr>
<tr><th colspan="2">$X1 - \mu_1$ / $X2 - \mu_2$</th><th>1</th><th>2</th><th>3</th><th>4</th><th>5</th><th>6</th><th>7</th><th>8</th></tr>
<tr><td rowspan="8">CACHE HIT RATE</td><td>1</td><td rowspan="3" colspan="3">0</td><td rowspan="3" colspan="2">$\sigma_3$</td><td>$\sigma_3$</td><td>$2\sigma_3$</td><td>$3\sigma_3$</td></tr>
<tr><td>2</td><td>$\sigma_3$</td><td>$\sigma_3$</td><td>$2\sigma_3$</td></tr>
<tr><td>3</td><td>$\sigma_3$</td><td>$\sigma_3$</td><td>$\sigma_3$</td></tr>
<tr><td>4</td><td rowspan="2" colspan="3">$-\sigma_3$</td><td rowspan="2" colspan="2">0</td><td rowspan="5" colspan="3">0</td></tr>
<tr><td>5</td></tr>
<tr><td>6</td><td>$-\sigma_3$</td><td>$-\sigma_3$</td><td>$-\sigma_3$</td><td rowspan="3" colspan="2">$-\sigma_3$</td></tr>
<tr><td>7</td><td>$-2\sigma_3$</td><td>$-\sigma_3$</td><td>$-\sigma_3$</td></tr>
<tr><td>8</td><td>$-3\sigma_3$</td><td>$-2\sigma_3$</td><td>$-\sigma_3$</td></tr>
</table>

FIG. 9

HOT/COLD ADDRESS/DATA DETERMINATION USING HASH ADDRESSES FOR A DATA STORAGE SYSTEM

TECHNICAL FIELD

The disclosure herein to data storage, particularly relates to determining hot/cold addresses in data storage systems containing flash memories.

BACKGROUND

Most computing systems have a storage for storing data. With the development in the storage technology, a lot of modern data storage devices use memory devices such as flash memories instead of more conventional magnetic storage. Memory devices have no moving parts and thus provide excellent stability, durability, high information access speed, and low power consumption. Examples of data storage devices having such advantages include universal serial bus (USB) drives, memory cards having various interfaces, and solid state drives (SSDs). To improve effectiveness and lifespan of flash memory products, improved methods and storage systems are needed.

SUMMARY

The disclosed subject matter relates to systems, methods, and devices that may determine whether an address accessed by a command in a storage system is hot or cold. Data associated with hot addresses frequently accessed by read commands may be cached in the storage controller to improve system read performance. Hot addresses frequently written to by write commands may be good candidates for garbage collection.

In an exemplary embodiment, there is provided a data storage system that may comprise a storage controller and a first interface to be coupled to a host. The storage controller may be configured to: receive a command containing an address in the data storage system via the first interface from the host; generate a set of hash addresses for the address; for each hash address of the set of hash addresses: obtain a stored hotness score associated with the hash address, update the stored hotness score to generate an updated hotness score, determine that the updated hotness score is above a hotness threshold; and determine that the address is hot.

In another exemplary embodiment, there is provided a method comprising: receiving a command containing an address in a data storage system from a host; generating a set of hash addresses for the address; for each hash address of the set of hash addresses: obtaining stored hotness score associated with the hash address, updating the stored hotness score to generate an updated hotness score associated with the hash address, and determining that the updated hotness score is above a hotness threshold; and determining that the address is hot.

In yet another embodiment, there may be provided one or more non-transitory computer-readable media encoded with computer executable instructions that, when executed, cause at least one processor to perform actions comprising: receiving a read command containing an address in a data storage system from a host; generating a set of hash addresses for the address; for each hash address of the set of hash addresses: obtaining a stored hotness score associated with the hash address, updating the stored hotness score to generate an updated hotness score, and determining that the updated hotness score is above a hotness threshold; and determining that the address is hot.

BRIEF DESCRIPTION OF FIGURES

FIG. 9 schematically shows a decision map for hotness score adjustment in accordance with an embodiment of the present disclosure.

DETAILED DESCRIPTION

Figure 1:
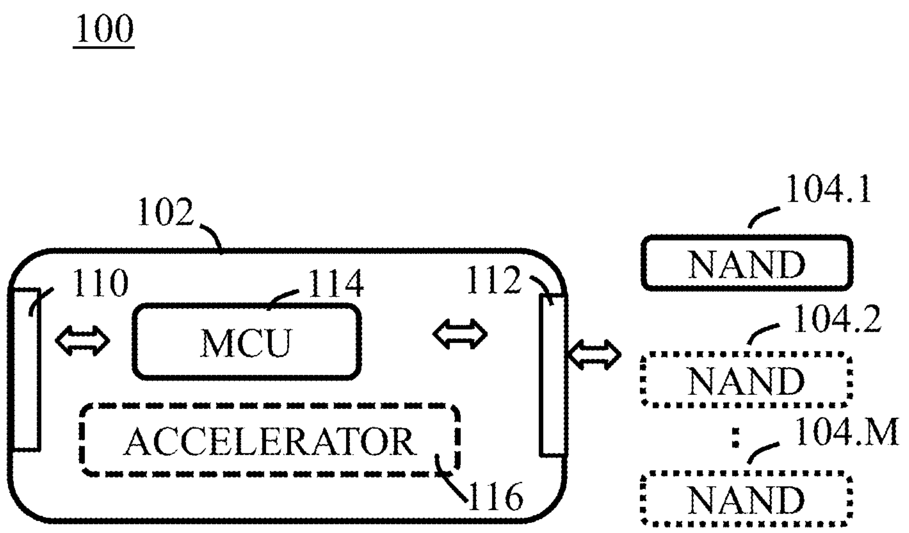
FIG. 1 schematically shows a storage system in accordance with an embodiment of the present disclosure.

Specific embodiments according to the present disclosure will now be described in detail with reference to the accompanying figures. Like elements in the various figures are denoted by like reference numerals for consistency.

FIG. 1 schematically shows an exemplary storage system 100 according to an embodiment. The storage system 100 may comprise a storage controller 102 and one or more non-volatile storage devices 104.1 to 104.M. The storage controller 102 may comprise a first interface 110, a second interface 112, a microcontroller unit (MCU) 114 and an optional accelerator 116. The first interface 110 may be any existing or yet to be developed interface that is configured to couple the storage system 100 to a host (e.g., a computing system) and receive data from and transmit data to the host. In one embodiment, for example, the first interface 110 may be a Peripheral Component Interconnect Express (PCIe). In another embodiment, the first interface 110 may be another suitable interface for a host to access the storage system. The second interface 112 may be any existing or yet to be developed interface that is configured to couple a storage controller to one or more storage devices. In one embodiment, the second interface 112 may be a multi-channel interface that may be configured to transfer encoded data (e.g., Error Correction Coding (ECC) codewords) over multiple channels in parallel. For example, the second interface 112 may be an Open NAND Flash Interface (ONFI) that may support different protocols (e.g., Non-volatile Double Data Rate (NVDDR), NVDDR Type 2 (NVDDR2,) NVDDR Type Three (NVDDR3), and Toggle protocols) and run at different transfer speeds.

The non-volatile storage devices 104.1 through 104.M may be non-volatile memory devices (NVMs). In one embodiment, there may be only one non-volatile storage device 104.1. In another embodiment, there may be more than one non-volatile storage device, for example, the non-volatile storage devices 104.2 through 104.M (shown in phantom). When there are a plurality of non-volatile storage devices, M may be a positive integer larger than one, for example, 2, 3, 4 or a larger number. In various embodiments, the storage system 100 may be a USB, a SSD or any other suitable storage system comprising NVMs.

The host may perform a variety of data processing tasks and operations using the data storage system 100 via the first interface 110. In an embodiment, the host may use a logical block address (LBA) for specifying the location of a block in the data storage devices. LBA may be a linear addressing scheme in which blocks may be located by an integer index, for example, the first block being LBA 0, the second LBA 1, and so on. When the host wants to read data from or write data to the storage system, the host may issue a read or write command with an LBA and a length to the storage system.

Data may be stored in the non-volatile storage devices 104.1 through 104.M on physical pages of physical blocks. The logical blocks used by the host are mapped or translated to physical address by the storage controller 102. In some embodiments, mapping from LBA to physical block address (PBA) may be performed by the MCU 114. The MCU 114 may be a computer processor configured to execute executable instructions (e.g., software or firmware). In various embodiments, the MCU 114 may be a microprocessor, a microcontroller, a field-programmable gate array (FPGA), or an application-specific IC (ASIC) or a Graphic Processing Unit (GPU). Not all embodiments may have the optional accelerator 116. In an embodiment that the accelerator 116 is provided, some computation tasks may be carried out by the accelerator 116. The accelerator 116 may be implemented by a microprocessor, a microcontroller, a FPGA, an ASIC or a GPU.

It should be noted that the data sent by the host may be encoded (e.g., ECC encoded) into codewords at the storage controller 102 and the codewords are saved to the non-volatile storage devices. Therefore, in some embodiments, the storage controller 102 may comprise one or more ECC encoders and one or more ECC decoders.

Non-volatile storage devices such as flash memory devices, however, have some unique characteristics. For example, a flash memory must be erased before written. In an embodiment, the erasure size may be a block, which is larger than a page that is the unit size of a write operation. A garbage collection process may be performed before a rewrite takes place. During garbage collection, pages with valid data in a block to be erased are read and rewritten in another previously erased block, then the whole block is erased and ready for new data.

Data stored on the non-volatile storage devices 104.1 through 104.M may be categorized as hot or cold according to access characteristics. For example, data stored at a certain LBA may be hot data when the host (e.g., the operating system (OS) of the host computing system) frequently access that data; and data stored at a certain LBA may be cold data when the host (e.g., the operating system (OS) of the host computing system) seldomly access that data. There may be four categories of hot/cold data: hot write, hot read, cold write and cold read. Hot write may refer to data frequently written to a certain LBA. Hot read may refer to data frequently read from a certain LBA. Cold write may refer to data seldomly written to a certain LBA. Cold read may refer to data seldomly read from a certain LBA. Because data may be accessed by read or write commands with addresses, these addresses may be identified as hot or cold addresses, as well.

The storage system 100 may be configured to perform hot/cold data/address determination to have improved efficiency. For example, the storage controller 102 may have a cache and put frequently read data in the cache to improve system performance. In another example, the storage system 100 may perform garbage collection, during which certain blocks may be picked for erasure. If a block picked for erasure has valid data, that valid data need to be saved to a different block. In an embodiment, the storage controller 102 may be configured to determine whether data in a storage block is hot or cold, and whether to choose that block for garbage collection. For example, if a block contains one or more pages of hot write data, that data may be modified in near future and the one or more pages containing that data will be marked as invalid soon. Therefore, the storage controller 102 may determine that the block is not a good candidate for garbage collection and the block may be directly erased when all pages in the block become invalid.

Moreover, the storage system 100 may provide wear leveling. Flash memory may be programmed (e.g., written to) and erased only a limited number of times, which may be referred to a maximum Program/Erase (P/E) cycles. If a storage block is programmed and erased repeatedly, the block may wear out soon. Wear leveling may distributes writes as evenly as possible across all blocks in a non-volatile storage device. In one embodiment, cold write data may be moved from blocks so that these blocks may be used for hot write data, thus more evenly increasing P/E cycles for all block and obtaining an improved wear leveling for the storage device.

Furthermore, the storage system 100 may provide over-provisioning for storage such that provided storage size may be larger than a nominal value. For example, a storage system may nominally provide 4 GB storage space (e.g., user capacity) but may provide 5 GB storage space (e.g., physical capacity). In this example, the storage system provides 20% overprovisioning (e.g., (physical capacity—user capacity)/user capacity). Overprovisioning may allow a storage system reserve some blocks for garbage collection and wear leveling. Embodiments implementing hot/cold determination may reduce the chance for garbage collection and more evenly place frequently write data, and thus may reduce the overprovisioning ratio.

In yet another example, the plurality of non-volatile storage devices 104.1 through 104.M may comprise different types of NAND such as fast NAND (e.g., Single-Level Cell (SLC)) and slow NAND (e.g., Quad-Level Cell (QLC)). Fast NAND may have a faster read/program time and more PE cycles but is expensive and has a smaller capacity. Slow NAND may have a larger capacity but less PE cycles and longer read/program time. The storage controller 102 may be configured to store hot data to fast NAND and cold data to slow NAND to improve the overall performance.

It should be noted that embodiments according to present disclosure may use hot/cold determination in many applications that improves efficiency and lifetime of the storage system 100. Caching, garbage collection, overprovisioning, wear leveling, storing hot or cold data to different types of NVMs are non-limiting examples.

When the host send data to the storage system 102 or read data from the storage system 102, the host may issue a write or read command with an LBA specifying the location of data storage, a length specify the size of data storage. For example, the host may issue a write command with address being LBA 100 and length being 5 for writing data to 5 logical blocks (e.g., writing to LBA 100 through LBA 104), or the host may issue a read command with address being LBA 002 and length being 2 for reading from 2 logical blocks (e.g., reading from LBA 002 and LBA 003). Embodiments according to the present disclosure may determine whether address associated with the command and also whether data associated with the address may be hot or cold.

Figure 2:
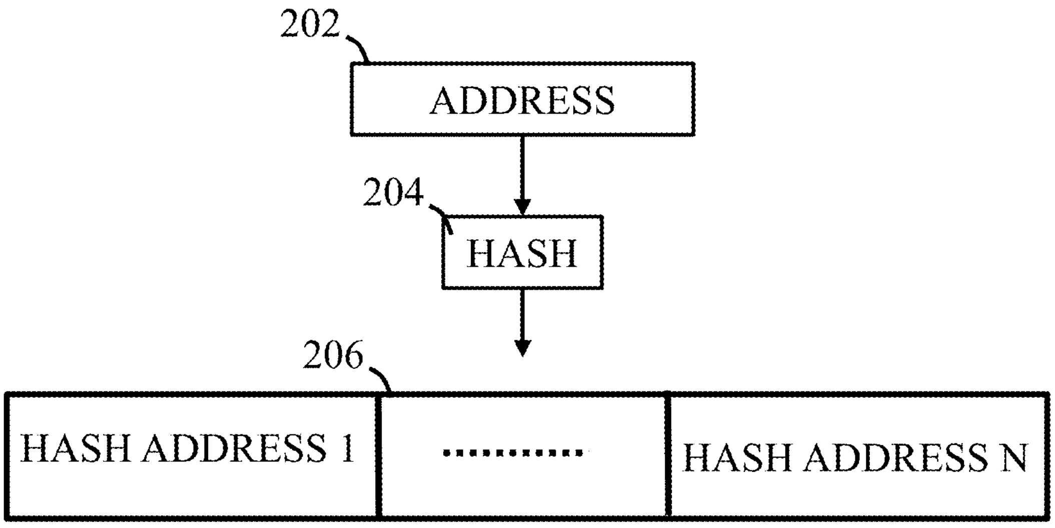
FIG. 2 schematically shows hash address generation in accordance with an embodiment of the present disclosure.

FIG. 2 schematically shows hash addresses generation in accordance with an embodiment of the present disclosure. Whether an address (e.g., an LBA) or data associated with the address may be hot or cold may be determined by how frequently that address is accessed. In various embodiments, an address 202 may be used as an input to a hash operation 204. The hash operation 204 may be any known, or yet to be developed hash techniques. In one embodiment, one hash value may be generated by the hash operation 204 and the hash value may point to an entry in a table 206. The hash value may also be referred to as a hash address. The table 206 may have N entries, with N being a positive integer selected based on design choice (e.g., hardware size constraint, etc.). Each entry in the table 206 may use a hash address as an index and the entry may include information to indicate hotness score of the address 202, information about the previous command that accessed the address, or both. In some embodiments, the table 206 may be referred to as an address tracking table.

There is a possibility that two or more different addresses may generate a same hash address. This is referred to as a hash collision. But the possibility that two or more different addresses may generate a same set of hash values are much lower. Therefore, in some embodiments, the hash operation 204 may generate multiple hash addresses from one address. In those embodiments, the hash operation 204 may implement some existing or yet to be developed hash techniques such that the hash values generated from the same address may point to different entries of the table 206 as much as possible. For example, a hash value may be generated by combining two separate hash functions, such as, but not limited to: hash_func1(LBA)+i*hash_func2(LBA), in which hash_func1 may be a first hash function, and hash_func2 may be a second hash function that is different from the first hash function, and the lower letter "i" may be an index of 1 to k such that k hash addresses may be generated for one LBA. The lower letter "k" may be a positive integer selected based on a design choice, for example, based on the size of the storage of the storage system, silicon area of the storage controller, etc. Exemplary number of "k" may be 5, 6 or 7.

In some further embodiments, the hash value may be generated by combining two separate hash functions with a non-linear term of "i", such as, but not limited to: hash_func1(LBA)+i*hash_func2(LBA)+(i−1)^2, in which "^" may be power of 2. This may further reduce the possibility of wrap around conflict, which may occur because hashing generally involves taking a reminder of a hash constant and a number plus the one or more whole hash constants will generate the same hash value as the number itself.

Figures 3, 4, 5, 6:
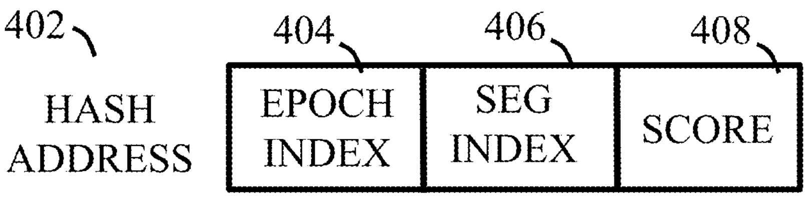
FIG. 3 schematically shows an epoch of addresses in accordance with an embodiment of the present disclosure.
FIG. 4 schematically shows a data structure for an entry of an access tracking table in accordance with an embodiment of the present disclosure.
FIG. 5 schematically shows a decay factor lookup table for epoch difference in accordance with an embodiment of the present disclosure.
FIG. 6 schematically shows a decay factor lookup table for segment difference in accordance with an embodiment of the present disclosure.

FIG. 3 schematically shows an epoch 300 of addresses in accordance with an embodiment of the present disclosure. How often an address is accessed may also be referred to as the hotness of the address. To determine the hotness of an address, each data access command may be assigned a command index and the command index may be used to determine an inter-reference recency (IRR). IRR may be the distance between a current command accessing an address and the most recent previous command that has accessed the same address. The epoch 300 may illustrate segmentation of addresses for a stream of data access commands. As shown in FIG. 3, in one example, the epoch 300 may include 2048 commands, each of which may have an address (e.g., 2048 LBAs). The epoch 300 may contain 16 segments with each segment containing 128 addresses.

In some embodiments, a hotness score may be assigned to each hash address in the table 206. The hotness score may be updated when the hash address has a hit by a command. For example, the command's address (e.g., LBA) may be used as the address 202 sent to the hash operation 204 and the hash operation 204 may generate a hash value that matches a hash address in the table 206. The hotness score may be updated based on the distance between the current command and the previous command that generates the same hash address. With segmentation of commands, the distance between two commands generating the same hash address may be represented by epoch difference and segment difference. Therefore, the hotness score may be updated based on the distance represented by epoch and segment differences. It should be noted that there may be false positive hits on a same hash address. That is, two or more different LBAs may generate a same hash address. Using the set of "k" hash addresses may reduce occurrences of false positive. For embodiments that one address may be used to generate "k" hash addresses, each of the "k" hash addresses may have an associated hotness score, and "k" hotness scores may be associated with one LBA and updated for each hit of the LBA.

FIG. 4 schematically shows a data structure 400 for an entry of an access tracking table in accordance with an embodiment of the present disclosure. The data structure 400 shows that each entry of the table 206 may be identified by a hash address 402, and may include an epoch index field 404, a segment index field 406 and a score field 408. The hash address 402 may be used an index for this entry in the table 206. The epoch index field 404 may store the epoch index of the most recent command. The segment index field 406 may store the segment index of the most recent command. The score field 408 may store the hotness score for this hash address as of the most recent command.

In some embodiments, when a command with an address is received, the command may be referred to as a current command. The current command may be processed to determine whether the address of the current command may be hot or cold based on the hotness score(s) associated with the address. For each command accessing an entry identified by a hash value, the hotness score stored at that entry may be updated by adding a pre-determined value (for getting hotter by each command) and subtracting an amount of decrease (e.g., for getting colder with time passing). The pre-determined value for increase may be referred to as add_score, which may be obtained by experimenting different values and selecting one that has the best result. The amount of decrease may be determined based on the distance between the current command and the previous command that updated this entry.

Decrease of the hotness score may be referred to as decay and the amount of decrease may also be referred to as amount of decay. There may be a decay factor based on epoch difference and another decay factor based on segment difference. The amount of decrease may be determined by multiplying the decay factor to a decay weight. In some embodiments, there may be a single decay weight for both epoch and segment decay factors and the amount of decay may be set to the sum of epoch decay factors and segment decay factor multiplied by the decay weight, such as (decay_factor_epoch+decay_factor_segment)*decay_weight, in which decay_factor_epoch may be the decay factor determined based on epoch difference, decay_factor_segment may be the decay factor determined based on segment difference, decay_weight may be a decay weight, and "*" may be a multiplication operator. In one embodiment, decay_weight may be obtained by dividing the current hotness score stored in the hotness score field 408 by the value of add_score (e.g., decay_weight=stored hotness score/add_score).

FIG. 5 schematically shows a decay factor lookup table 500 for epoch difference in accordance with an embodiment of the present disclosure. The lookup table 500 may contain a plurality of entries (e.g., 16 entries) with the epoch differences as indices for the entries, and each entry has a decay factor for the corresponding epoch difference. For example, the epoch index of the current command may be compared with the epoch index value stored in the epoch index field 404, and the epoch difference may be used to find a corresponding entry in the lookup table 500 to obtain the decay factor for this epoch difference. The lookup table 500 may be hardware friendly and implemented by hardware circuits. The lookup table 500 may also be referred to as an epoch decay factor lookup table.

FIG. 6 schematically shows a decay factor lookup table 600 for segment difference in accordance with an embodiment of the present disclosure. The lookup table 600 may contain a plurality of entries (e.g., 16 entries) with the segment differences as indices for the entries, and each entry has a decay factor for the corresponding segment difference. For example, the segment index of the current command may be compared with the segment index value stored in the segment index field 406, and the segment difference may be used to find a corresponding entry in the lookup table 600 to obtain the decay factor for this segment difference. The lookup table 600 may also be hardware friendly and also implemented by hardware circuits. The lookup table 600 may also be referred to as a segment decay factor lookup table.

It should be noted that the number of entries in table 500 and the number of entries in table 600 may be determined separately and not necessarily equal. The 16-entry table 500 and 16-entry table 600 are merely examples. For the example of 16 entries of table 500, the epoch index may be 4 bits. In this example, assuming each epoch has 2048 commands, the epoch indices may be wrapped around after 16*2048 commands. That is, after 16*2048 commands, the epoch index will repeat again. Regardless of the size of epoch and segment, in one embodiment, the overall decay factor would be zero if there is no epoch and segment difference. That is, a subsequent command with the same address as the most recent command in the same segment will not have decay (e.g., no decrease in hotness score, only increase by add_score).

The epoch difference and segment difference between two commands with a same hash address may be obtained by any known or yet to be developed techniques. As an example, assuming the epoch index is 4 bits and the segment index is also 4 bits, the epoch index and segment index may form a two-digit hexadecimal number, with the epoch index being the most significant digit and the segment index being the least significant digit. The distance between two commands having a same hash address may be calculated by subtracting two hexadecimal numbers. If the hexadecimal number for the later command is smaller than the hexadecimal number for the earlier command (e.g., epoch index and segment index obtained from the table 206), there may be a wrap around for the epoch index and the epoch difference may be obtained by first subtracting the previous epoch index from 15 and then adding the current epoch index (or adding the current epoch index minus 1 if there is borrowing for the segment digit calculation).

In some embodiments, the updated hotness score may be calculated as: updated_score=prev_score−amount of decay+add_score, in which the prev_score may be the hotness score value stored in the table 206 (e.g., score field 408), the amount of decay may be obtained based on the decay factor and decay weight for epoch difference and decay factor and decay weight for segment difference, and add_score may be the pre-determined value for incrementing the hotness for each hit on the hash address.

Whether an address (and the data associated with the address) is hot may be determined by comparing the hotness scores associated with the address to a hotness threshold value. For an embodiment in which one address is used to generate a set of "k" hash addresses, each of the "k" hotness scores need to be above the hotness threshold for the address to be determined as hot. In one embodiment, hot data determination may be implemented by a k-iteration loop. In each iteration, one of the "k" hash addresses may be generated, the hotness score associated with this hash address may be updated (e.g., by amount of decrease based on distance and add_score), and the updated hotness score may be compared to the hotness threshold. If inside any loop, the hotness score is smaller than the hotness threshold, the address may be determined to be cold.

In some embodiments, the hotness scores may be tracked for read commands. In these embodiments, hotness scores associated with an address may be used to improve read performance of a storage system 100. For example, if hotness scores generated from an address of a read command are above a hotness threshold, data accessed by the read command may be kept in a cache of the storage controller 102. For example, if a read command with a certain LBA is marked as hot, then system 100 will check if corresponding LBAs (start from first LBA and later LBAs indicated by length of the command) are in the cache. If yes, the system 100 may update the priority of LBAs in Least Recently Used (LRU) cache, otherwise, system 100 will put the data in LBAs into the cache and update the LRU. If an address of a read command is not hot, data accessed by the read command may be cold data and not kept in the cache. Therefore, the storage controller 102 may use hot/cold determination to improve cache hit rate by keeping as much as hot read data in the cache.

In some other embodiments, addresses for write commands may be determined to be hot. In these embodiments, the storage controller 102 may determine whether a write command is hot and the data associated with the write command need to put into a cache. When a read command is received, hotness tracking is not performed on it.

When hot data is maintained in a cache, for either hot read data or hot write data, there may be cache evictions. For example, in embodiments where read commands may be traced to improve cache hit rate, when a write command is received, data stored in the location pointed to by the address (e.g., LBA) of the write command may be updated. If there is data accessed by the command in the cache, the cache content associated with the address may be dirty. To maintain the cache hit rate, the cache associated with the address may be evicted. In the embodiments of hot write data caching, the cache may become full and some cache content may need to be evicted. Therefore, the storage controller 102 may implement an eviction process to update the hotness score for eviction of an address.

The storage controller 102 may initiate the eviction process by an eviction command. For hot read data caching, write commands may be used as eviction commands. For hot write data caching, an eviction command may be generated when an address is evicted and sent to the part of the storage controller 102 that determines hot/cold addresses.

In some embodiments that each address may be used to generate a set of "k" hash addresses, when an eviction command with an eviction address (e.g., LBA) is received, the hotness score associated with the set of hash addresses generated from the eviction address may all be reduced if the address is already being tracked in the table 206. For example, the storage controller 102 may generate the set of hash addresses for the eviction address, compare the hotness scores associated with the set of hash addresses to an eviction threshold, determine that the hotness scores are all above the eviction threshold value and reduce the hotness scores. In some embodiments, this eviction process may include by a k-iteration loop. Inside each iteration, the storage controller 102 may generate one hash address, obtain the hotness score associated with this hash address and compare the hotness score to the eviction threshold value. The eviction threshold value may be held in a control register. If any hotness score of the "k" hotness scores is smaller than the eviction threshold value, the storage controller 102 may determine that the address has not been tracked and the eviction process may end. If all "k" hotness scores are larger than the eviction threshold, the minimum hotness score among the "k" hotness scores may be identified and each of the "k" hotness scores may be reduced by this minimum hotness score. Regardless of whether there may be more than one command with this address, the minimum score may be account for all occurrences of previously tracked commands with this address. In one embodiment, the epoch index and segment index associated with the "k" hash addresses may be left as is (e.g., not updated).

The parameters for hotness score calculation, including but not limited to, the add_score, decay factor for epoch difference, decay factor for segment difference, hotness threshold value and eviction threshold value, may be obtained by experiments using test data. For example, the storage system 100 may be configured using a Storage Performance Council (SPC) On-line Transaction Processing (OLTP) Financial Dataset (e.g., "Financial1.spc" known in the industry).

In some embodiments, an initial parameter value may be assigned based on system configuration and the parameter value may be adjusted based on tests. For example, the initial values of add_score value, decay factor for epoch difference, decay factor for segment difference may be assigned based on the epoch and segment sizes. Assuming an epoch has 16 segments and there are 16 epochs (e.g., 256 segments) in one wrap around of epoch and segment numbers, an initial value of 256 may be assigned to add_score and an initial value of one may be assigned to the decay factor for one segment difference. With these initial values, if an address is visited twice, the hotness score accumulated by the two hits will not be completely removed after one whole wrap around of epochs (e.g., 16 epochs). Therefore, the add_score value may be decreased and the decay factor may be increased to compensate this effect. In one embodiment, the add_score value may be selected to be 128, the decay factor for segment difference of one may be selected to be 2, and the hotness threshold value may be a number between 2 and 3 times of the add_score value (e.g., 2.5 times 128=320).

Figure 7:
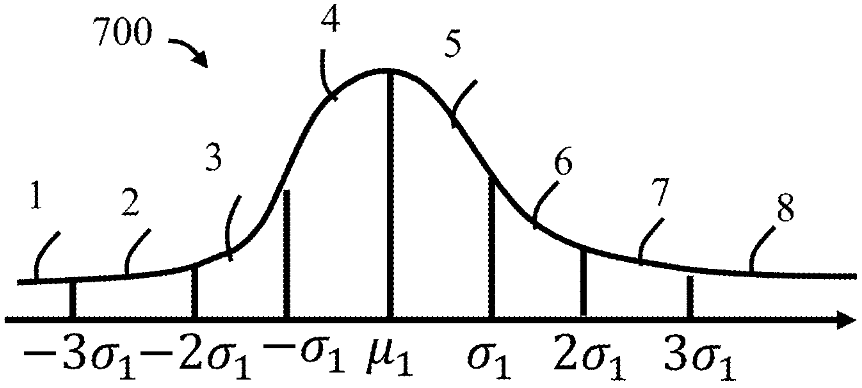
FIG. 7 schematically shows a hot LBAs ratio distribution in accordance with an embodiment of the present disclosure.

FIG. 7 schematically shows a hot LBAs ratio distribution 700 in accordance with an embodiment of the present disclosure. In some embodiments, the hotness threshold value may be adjusted by distributions of hot LBAs ratio, cold hotness score and cache hit rate. In the hot LBAs ratio distribution 700, the vertical axis may be the number of windows having a certain hot LBAs ratio, the horizontal axis may be hot LBAs ratios. A window may be a number of LBAs and the hot LBAs ratio may be number of hot LBAs divided by the total number of LBAs in the window. For example, if a window size is 128 LBAs, for 3 million commands, there may be at least 23437 windows (e.g., 3 million/128). But a command may have a length of 2 or more and thus a command may generate hits on two or more LBAs. The hot LBAs ratio may be obtained by dividing the hot LBAs in a window over the total 128 LBAs in the same window. Each data point (e.g., bin) in the distribution 700 may be the number of windows at that hot LBA ratio.

It should be noted that when performing hot/cold determination for an address or data associated with the address, only the starting LBA may be considered in some embodiments. But when the distribution 700 is obtained, the hot LBAs are counted for the starting LBA and any other LBAs based on the length specified in the command. For example, if the starting LBA is LBA 000 and the length is two, LBA 000 and LBA 001 are processed for hot LBAs ratio for distribution 700.

The distribution 700 of hot LBAs ratio may be obtained using the Financial1.spc dataset. It may be a gaussian distribution with a mean value $\mu_1$ and a variation value $\sigma_1$. The gaussian distribution 700 may be divided into eight (8) zones using the variation value $\sigma_1$. As shown in FIG. 7, there may be zone 1 (e.g., smaller than $-3\sigma_1$), zone 2 (e.g., between $-3\sigma_1$ and $-2\sigma_1$), zone 3 (e.g., between $-2\sigma_1$ and $-\sigma_1$), zone 4 (e.g., between $-\sigma_1$ and 0), zone 5 (e.g., between 0 and $\sigma_1$), zone 6 (e.g., between $\sigma_1$ and $2\sigma_1$), zone 7 (e.g., between $2\sigma_1$ and $3\sigma_1$), and zone 8 (e.g., larger than $3\sigma_1$). In one embodiment, the distribution 700 may be obtained by tracking read commands (e.g., hot address determination for read commands).

Figure 8:
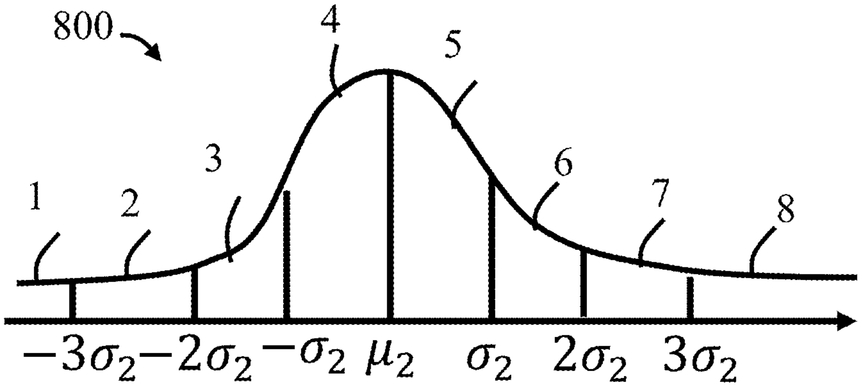
FIG. 8 schematically shows a cache hit rate distribution in accordance with an embodiment of the present disclosure.

FIG. 8 schematically shows a cache hit rate distribution 800 in accordance with an embodiment of the present disclosure. The distribution 800 of cache hit rate may also be obtained using the Financial1.spc dataset and may also be a gaussian distribution with the horizontal axis being the cache hit rate and the vertical axis being the number of windows having that particular cache hit rate. The distribution 800 may have a mean value $\mu_2$ and a variation $\sigma_2$. The gaussian distribution 800 may be divided into eight (8) zones using the variation value $\sigma_1$. As shown in FIG. 8, there may be zone 1 (e.g., smaller than $-3\sigma_2$), zone 2 (e.g., between $-3\sigma_2$ and $-2\sigma_2$), zone 3 (e.g., between $-2\sigma_2$ and $-\sigma_2$), zone 4 (e.g., between $-\sigma_2$ and 0), zone 5 (e.g., between 0 and $\sigma_2$), zone 6 (e.g., between $\sigma_2$ and $2\sigma_2$), zone 7 (e.g., between $2\sigma_2$ and $3\sigma_2$), and zone 8 (e.g., larger than $3\sigma_2$). In one embodiment, the distribution 800 may be obtained by tracking read commands (e.g., hot address determination for read commands).

For the distribution of cold hotness sore, the horizontal axis may be the hotness scores that are smaller than the hotness threshold value. Vertical axis may be the number of visits. For example, for 10000 commands and k=7, 70000 hash addresses may be generated in total. If 30000 out of 70000 hash addresses generate hits on some hash addresses and generate updated hotness scores smaller than hotness threshold value, then the distribution of cold hotness score is the distribution of hotness scores generated by these 30000 hits. As an example, if hotness score 128 occurs 3000 times (e.g., 3000 hash addresses having the hotness score of 128), then the height of bin 128 is 3000.

The cold hotness score distribution may also be obtained using the Financial1.spc dataset and may also be a gaussian distribution with a mean value $\mu_3$ and a variation $\sigma_3$. In one embodiment, the cold hotness score distribution may also be obtained by tracking read commands (e.g., hot address determination for read commands).

FIG. 9 schematically shows a decision map 900 for hotness score adjustment in accordance with an embodiment of the present disclosure. During operation on real user data, after a predetermined number of LBAs having been processed (e.g., 128 LBAs), the distributions of hot LBAs ratio and cache hit rate may be obtained with X1 as the mean value for the hot LBAs ratio and X2 as the mean value for the cache hit rate. X1 may be compared to $\mu_1$ (e.g., X1−$\mu_1$) and X2 may be compared to $\mu_2$ (e.g., X2−$\mu_2$). The comparisons may be fitted to the distribution obtained by the Financial1.spc dataset, for example, X1−$\mu_1$ may fall into one of the eight zones of the distribution 700, X2−$\mu_2$ may fall into one of the eight zones of the distribution 800. Based on the decision map 900, the hotness threshold value may be adjusted.

As shown in the decision map 900, when X1−$\mu_1$ and X2−$\mu_2$ are in matching zones, there may be no adjustment to the hotness threshold value. For example, when X1−$\mu_1$ is in zone 1, 2 or 3 of the distribution 700 and X2−$\mu_2$ is in zone 1, 2 or 3 of the distribution 800, there is no adjustment to the hotness threshold value. Also, when X1−$\mu_1$ is in zone 4 or 5 of the distribution 700 and X2−$\mu_2$ is in zone 4 or 5 of the distribution 800, there is no adjustment to the hotness threshold value. In addition, when X1−$\mu_1$ is in zone 6, 7 or 8 of the distribution 700 and X2−$\mu_2$ is in zone 6, 7 or 8 of the distribution 800, there is no adjustment to the hotness threshold value.

When X1−$\mu_{11}$ and X2−$\mu_2$ are in different zones, the hotness threshold value may start to be adjusted. For example, when X1−$\mu_1$ is in zone 4, 5 or 6 of the distribution 700 and X2−$\mu_2$ is in zone 1, 2, or 3 of the distribution 800, or when X1−$\mu_1$ is in zone 7 or 8 of the distribution 700 and X2−$\mu_2$ is in zone 3 of the distribution 800, the hotness threshold value may be increased by $\sigma_3$. When X1−$\mu_1$ is in zone 1, 2 or 3 of the distribution 700 and X2−$\mu_2$ is in zone 4, 5, or 6 of the distribution 800, or when X1−$\mu_1$ is in zone 3 of the distribution 700 and X2−$\mu_2$ is in zone 7 or 8 of the distribution 800, the hotness threshold value may be reduced by $\sigma_3$.

When X1−$\mu_1$ and X2−$\mu_2$ are in zones further apart, the hotness threshold value may be adjusted more. For example, when X1−$\mu_1$ is in zone 7 of the distribution 700 and X2−$\mu_2$ is in zone 1 of the distribution 800, or when X1−$\mu_1$ is in zone 8 of the distribution 700 and X2−$\mu_2$ is in zone 2 of the distribution 800, the hotness threshold value may be increased by 2$\sigma_3$. And when X1−$\mu_1$ is in zone 1 of the distribution 700 and X2−$\mu_2$ is in zone 7 of the distribution 800, or when X1−$\mu_1$ is in zone 2 of the distribution 700 and X2−$\mu_2$ is in zone 8 of the distribution 800, the hotness threshold value may be reduced by 2$\sigma_3$.

When X1−$\mu_1$ and X2−$\mu_2$ are in zones furthest apart, the hotness threshold value may be adjusted most. For example, when X1−$\mu_1$ is in zone 8 of the distribution 700 and X2−$\mu_2$ is in zone 1 of the distribution 800, the hotness threshold value may be increased by 3$\sigma_3$, and when X1−$\mu_1$ is in zone 1 of the distribution 700 and X2−$\mu_2$ is in zone 8 of the distribution 800, the hotness threshold value may be reduced by 3$\sigma_3$.

Figure 10:
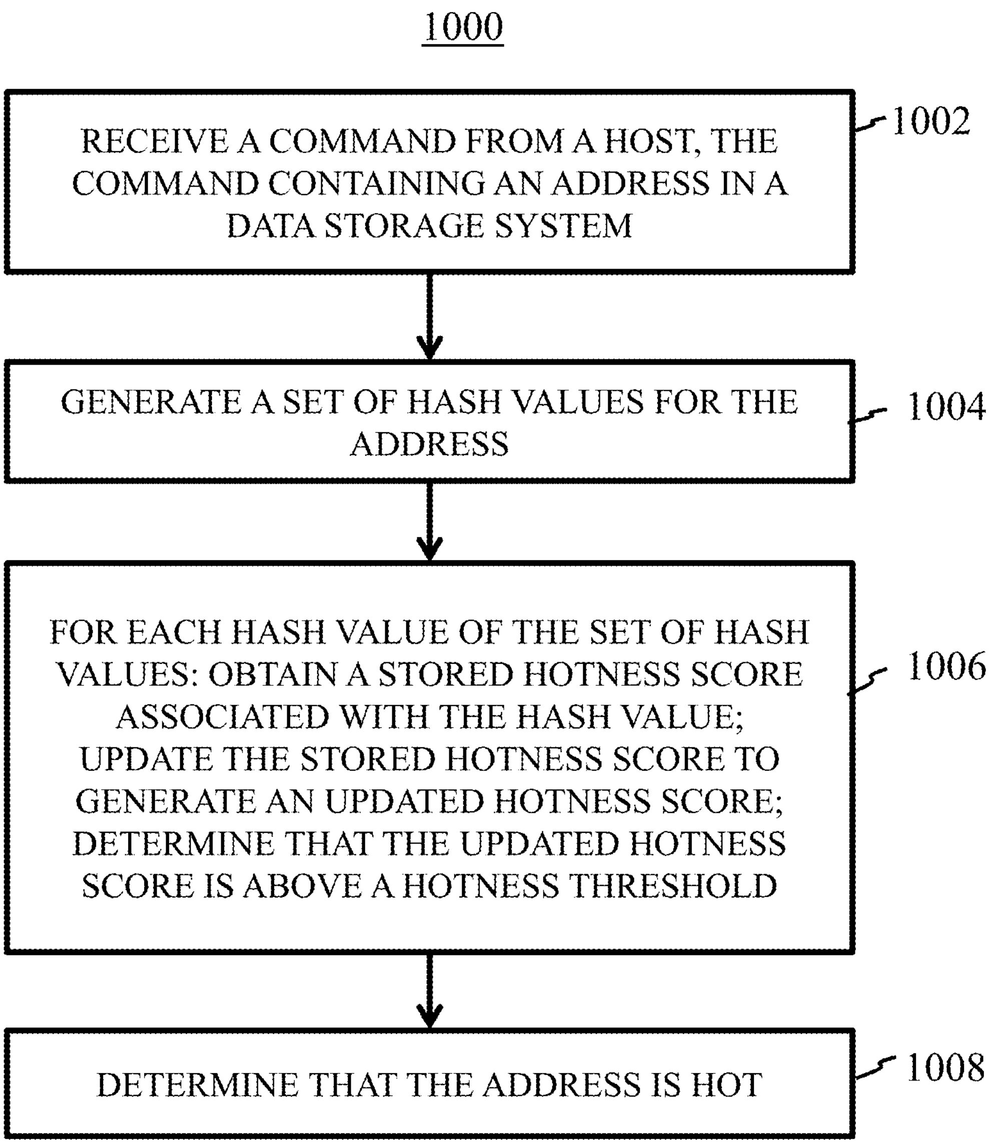
FIG. 10 is a flowchart of a process for determining hot/cold addresses in accordance with an embodiment of the present disclosure.

FIG. 10 is a flowchart of a process 1000 for determining hot/cold data in accordance with an embodiment of the present disclosure. At block 1002, a command may be received in a data storage system. For example, a memory access command for reading data stored in the storage system 100 may be received by the storage controller 102 from a host via the first interface 110. The command may contain an address (e.g., LBA) for data stored in the data storage system. At block 1004, a set of hash addresses may be generated for the address. For example, the hash operation 204 may generate multiple hash addresses from one address.

At block 1006, for each hash address of the set of hash addresses: a stored hotness score associated with the hash address may be obtained, the stored hotness score may be updated to generate an updated hotness score and the updated hotness score may be determined to be above a hotness threshold. For example, a hotness score may be assigned to each hash address and stored in a table (e.g., table 206). The hotness score may be updated when the hash address has a hit by a command and the updated hotness score may be compared to a hotness threshold value to determine whether data associated with the command is hot.

At block 1008, the address may be determined to be hot. For example, when all hotness scores of hash addresses generated from the address are above the hotness threshold value the storage system 100 may determine that the address of the command is hot. In one embodiment, read commands may be tracked and the storage system 100 may keep hot read data in the cache of the storage controller 102 to improve read performance of the storage system 100. In another embodiment, write commands may be tracked and the storage system 100 may keep track of the hot addresses and perform garbage collection on the hot addresses.

It should be appreciated that in some embodiments, the storage controller 102 may include fewer or more modules apart from those shown in FIG. 1. Moreover, the techniques described herein may be implemented in hardware, in software, or a combination of hardware and software. The choice of implementing any portion of the above techniques in hardware or software may depend on the requirements of an implementation. For example, the process 1000 may be in the form of firmware that is processed by Application Specific Integrated Circuits (ASICs), which may be integrated into a circuit board. Alternatively, the process 1000 may be in the form of one or more logic blocks included in a programmable logic device (e.g., a field-programmable gate array). Moreover, the process 1000 or at least portion of the process 1000 may be implemented by computer software instructions and encoded in volatile memory, non-volatile memory, RAM, flash memory, ROM, EPROM, or any other form of a non-transitory computer-readable storage medium.

In an exemplary embodiment, there is provided a data storage system. The data storage system may comprise a first interface to be coupled to a host and a storage controller. The storage controller may be configured: receive a command containing an address in the data storage system via the first interface from the host; generate a set of hash addresses for the address; for each hash address of the set of hash addresses: obtain a stored hotness score associated with the hash address, update the stored hotness score to generate an updated hotness score, determine that the updated hotness score is above a hotness threshold; and determine that the address is hot.

In an embodiment, the updated hotness score may be generated based on a distance between the command and a most recent command that also generates the hash address.

In an embodiment, the command may have an associated epoch index and an associated segment index, and the distance may be represented by an epoch index difference and a segment index difference.

In an embodiment, the storage controller may be further configured to obtain a decay_factor_epoch from an epoch decay factor lookup table and a decay_factor_segment from a segment decay factor lookup table, and calculate the updated hotness score as prev_score−(decay_factor_epoch+decay_factor_segment)*decay_weight+add_score, in which the prev_score is the stored hotness score, the decay_factor_epoch may be a decay factor for epoch difference, the decay_factor_segment may be a decay factor for segment difference, "*" may be a multiplication operator, decay_weight may be a decay weight, and add_score may be an amount of increase for each match of the hash address.

In an embodiment, the storage controller may be further configured to receive an eviction command with an eviction address and perform an eviction process to reduce hotness scores associated with the eviction address.

In an embodiment, the eviction process may comprise a k-iteration loop with k being the number of hash addresses in the set of hash addresses, and the storage controller may be further configured to perform the eviction process by: in each iteration of the k-iteration loop: generating an eviction hash address for the eviction address, obtaining a hotness score associated with the eviction hash address, comparing the hotness score to an eviction threshold value, ending the eviction process if the hotness score is smaller than the eviction threshold value, and recording the hotness score if the hotness score is larger than the eviction threshold value; determining a minimum hotness score among k hotness scores recorded in the k-iteration loop; and reducing each of the k hotness scores recorded in the k-iteration loop by the minimum hotness score.

In an embodiment, the hotness score may be tracked for read commands and the storage controller may be further configured to keep the data associated with the address in a cache and adjust the hotness threshold based at least in part on a cache hit rate distribution and a hot logical block addresses ratio distribution.

In another exemplary embodiment, there is provided a method comprising: receiving a command containing an address in a data storage system from a host; generating a set of hash addresses for the address; for each hash address of the set of hash addresses: obtaining stored hotness score associated with the hash address, updating the stored hotness score to generate an updated hotness score associated with the hash address, and determining that the updated hotness score is above a hotness threshold; and determining that the address is hot.

In an embodiment, the updated hotness score may be generated based on a distance between the command and a most recent command that also generates the hash address.

In an embodiment, the command may have an associated epoch index and an associated segment index, and the distance may be represented by an epoch index difference and a segment index difference.

In an embodiment, the method may further comprise obtaining a decay_factor_epoch from an epoch decay factor lookup table and a decay_factor_segment from a segment decay factor lookup table and calculating the updated hotness score as prev_score−(decay_factor_epoch+decay_factor_segment)*decay_weight+add_score, in which the prev_score is the stored hotness score, the decay_factor_epoch may be a decay factor for epoch difference, the decay_factor_segment may be a decay factor for segment difference, "*" may be a multiplication operator, decay_weight may be a decay weight, and add_score may be an amount of increase for each match of the hash address.

In an embodiment, the method may further comprise receiving an eviction command with an eviction address and performing an eviction process to reduce hotness scores associated with the eviction address.

In an embodiment, performing the eviction process may further comprise: performing a k-iteration loop with k being the number of hash addresses in the set of hash addresses, and in each iteration of the k-iteration loop: generating an eviction hash address for the eviction address, obtaining a hotness score associated with the eviction hash address, comparing the hotness score to an eviction threshold value, ending the eviction process if the hotness score is smaller than the eviction threshold value, and recording the hotness score if the hotness score is larger than the eviction threshold value; determining a minimum hotness score among k hotness scores recorded in the k-iteration loop; and reducing each of the k hotness scores recorded in the k-iteration loop by the minimum hotness score.

In an embodiment, the method may further comprise keeping the data associated with the address in a cache and adjusting the hotness threshold based at least in part on a cache hit rate distribution and a hot logical block addresses ratio distribution. The hotness score may be tracked for read commands.

In yet another embodiment, there may be provided one or more non-transitory computer-readable media encoded with computer executable instructions that, when executed, cause at least one processor to perform actions comprising: receiving a command containing an address in a data storage system from a host; generating a set of hash addresses for the address; for each hash address of the set of hash addresses: obtaining a stored hotness score associated with the hash address, updating the stored hotness score to generate an updated hotness score, and determining that the updated hotness score is above a hotness threshold; and determining that the address is hot.

In an embodiment, the address may be a logical block address (LBA).

In an embodiment, the updated hotness score may be generated based on a distance between the command and a most recent command that also generates the hash address.

In an embodiment, the command may have an associated epoch index and an associated segment index, and the distance may be represented by an epoch index difference and a segment index difference.

In an embodiment, the non-transitory computer readable storage media may be further encoded with computer executable instructions that, when executed, cause the at least one processor to perform further actions comprising: obtaining a decay_factor_epoch from an epoch decay factor lookup table and a decay_factor_segment from a segment decay factor lookup table; and calculating the updated hotness score as prev_score-(decay_factor_epoch+decay_factor_segment)*decay_weight+add_score, in which the prev_score is the stored hotness score, the decay_factor_epoch may be a decay factor for epoch difference, the decay_factor_segment may be a decay factor for segment difference, "*" may be a multiplication operator, decay_weight may be a decay weight, and add_score may be an amount of increase for each match of the hash address.

In an embodiment, the non-transitory computer readable storage media may be further encoded with computer executable instructions that, when executed, cause the at least one processor to perform further actions comprising: keeping the data associated with the address in a cache and adjusting the hotness threshold based at least in part on a cache hit rate distribution and a hot logical block addresses ratio distribution. The hotness score may be tracked for read commands.

In an embodiment, the non-transitory computer readable storage media may be further encoded with computer executable instructions that, when executed, cause the at least one processor to perform further actions comprising: receiving an eviction command with an eviction address In an embodiment, the non-transitory computer readable storage media may be further encoded with computer executable instructions that, when executed, cause the at least one processor to perform further actions comprising: receiving an eviction command with an eviction address; performing a k-iteration loop with k being the number of hash addresses in the set of hash addresses, and in each iteration of the k-iteration loop: generating an eviction hash address for the eviction address, obtaining a hotness score associated with the eviction hash address, comparing the hotness score to an eviction threshold value, ending the eviction process if the hotness score is smaller than the eviction threshold value, and recording the hotness score if the hotness score is larger than the eviction threshold value; determining a minimum hotness score among k hotness scores recorded in the k-iteration loop; and reducing each of the k hotness scores recorded in the k-iteration loop by the minimum hotness score.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

As used herein, a non-volatile memory device may be a computer storage device that can maintain stored information after being powered off, and the stored information may be retrieved after being power cycled (turned off and back on). Non-volatile storage devices may include floppy disks, hard drives, magnetic tapes, optical discs, NAND flash memories, NOR flash memories, Magnetoresistive Random Access Memory (MRAM), Resistive Random Access Memory (RRAM), Phase Change Random Access Memory (PCRAM), Nano-RAM, etc. In the description, a NAND flash may be used an example for the proposed techniques. However, various embodiments according to the present disclosure may implement the techniques with other kinds of non-volatile storage devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A data storage system, comprising:

a first interface to be coupled to a host; and a storage controller configured to:

receive a command via the first interface from the host, the command containing an address in the data storage system;

generate a set of hash addresses for the address;

for each hash address of the set of hash addresses:

obtain a stored hotness score associated with the hash address;

update the stored hotness score to generate an updated hotness score; and determine that the updated hotness score is above a hotness threshold; and determine that the address is hot.

2. The data storage system of claim 1, wherein the updated hotness score is generated based on a distance between the command and a most recent command that also generates the hash address.

3. The data storage system of claim 2, wherein the command has an associated epoch index and an associated segment index, and the distance is represented by an epoch index difference and a segment index difference.

4. The data storage system of claim 3, wherein the storage controller is further configured to obtain a decay_factor_epoch from an epoch decay factor lookup table and a decay_factor_segment from a segment decay factor lookup table, and calculate the updated hotness score as prev_score−(decay_factor_epoch+decay_factor_segment)*decay_weight+add_score, in which the prev_score is the stored hotness score, the decay_factor_epoch is a decay factor for epoch difference, the decay_factor_segment is a decay factor for segment difference, "*" is a multiplication operator, decay_weight is a decay weight, and add_score is an amount of increase for each match of the hash address.

5. The data storage system of claim 1, wherein the storage controller is further configured to receive an eviction command with an eviction address and perform an eviction process to reduce hotness scores associated with the eviction address.

6. The data storage system of claim 5, where in the eviction process comprises a k-iteration loop with k being a number of hash addresses in the set of hash addresses, and the storage controller is further configured to perform the eviction process by:

in each iteration of the k-iteration loop:

generating an eviction hash address for the eviction address;

obtaining a hotness score associated with the eviction hash address;

comparing the hotness score to an eviction threshold value;

ending the eviction process if the hotness score is smaller than the eviction threshold value; and recording the hotness score if the hotness score is larger than the eviction threshold value;

determining a minimum hotness score among k hotness scores recorded in the k-iteration loop; and reducing each of the k hotness scores recorded in the k-iteration loop by the minimum hotness score.

7. The data storage system of claim 1, wherein the hotness score is tracked for read commands and the storage controller is further configured to keep data associated with the address in a cache and adjust the hotness threshold based at least in part on a cache hit rate distribution and a hot logical block addresses ratio distribution.

8. A method, comprising:
receiving a command from a host, the command containing an address in a data storage system;
generating a set of hash addresses for the address;
for each hash address of the set of hash addresses:
obtaining stored hotness score associated with the hash address;
updating the stored hotness score to generate an updated hotness score associated with the hash address; and
determining that the updated hotness score is above a hotness threshold; and
determining that the address is hot.

9. The method of claim 8, wherein the updated hotness score is generated based on a distance between the command and a most recent command that also generates the hash address.

10. The method of claim 9, wherein the command has an associated epoch index and an associated segment index, and the distance is represented by an epoch index difference and a segment index difference.

11. The method of claim 10, further comprising:
obtaining a decay_factor_epoch from an epoch decay factor lookup table and a decay_factor_segment from a segment decay factor lookup table; and
calculating the updated hotness score as prev_score−(decay_factor_epoch+decay_factor_segment)*decay_weight+add_score, in which the prev_score is the stored hotness score, the decay_factor_epoch is a decay factor for epoch difference, the decay_factor_segment is a decay factor for segment difference, "*" is a multiplication operator, decay_weight is a decay weight, and add_score is an amount of increase for each match of the hash address.

12. The method of claim 8, further comprising:
receiving an eviction command with an eviction address; and
performing an eviction process to reduce hotness scores associated with the eviction address.

13. The method of claim 12, wherein performing the eviction process further comprises:
performing a k-iteration loop with k being a number of hash addresses in the set of hash addresses, and in each iteration of the k-iteration loop:
generating an eviction hash address for the eviction address;
obtaining a hotness score associated with the eviction hash address;
comparing the hotness score to an eviction threshold value;
ending the eviction process if the hotness score is smaller than the eviction threshold value; and
recording the hotness score if the hotness score is larger than the eviction threshold value;
determining a minimum hotness score among k hotness scores recorded in the k-iteration loop; and
reducing each of the k hotness scores recorded in the k-iteration loop by the minimum hotness score.

14. The method of claim 8, further comprising:
keeping data associated with the address in a cache, wherein the hotness score is tracked for read commands; and
adjusting the hotness threshold based at least in part on a cache hit rate distribution and a hot logical block addresses address ratio distribution.

15. One or more non-transitory computer readable storage media encoded with computer executable instructions that, when executed, cause at least one processor to perform actions comprising:
receiving a command from a host, the command containing an address in a data storage system;
generating a set of hash addresses for the address;
for each hash address of the set of hash addresses:
obtaining a stored hotness score associated with the hash address;
updating the stored hotness score to generate an updated hotness score; and
determining that the updated hotness score is above a hotness threshold; and
determining that the address is hot.

16. The non-transitory computer readable storage media of claim 15, wherein the updated hotness score is generated based on a distance between the command and a most recent command that also generates the hash address.

17. The non-transitory computer readable storage media of claim 16, wherein the command has an associated epoch index and an associated segment index, and the distance is represented by an epoch index difference and a segment index difference.

18. The non-transitory computer readable storage media of claim 17, further encoded with computer executable instructions that, when executed, cause the at least one processor to perform further actions comprising:
obtaining a decay_factor_epoch from an epoch decay factor lookup table and a decay_factor_segment from a segment decay factor lookup table; and
calculating the updated hotness score as prev_score−(decay_factor_epoch+decay_factor_segment)*decay_weight+add_score, in which the prev_score is the stored hotness score, the decay_factor_epoch is a decay factor for epoch difference, the decay_factor_segment is a decay factor for segment difference, "*" is a multiplication operator, decay_weight is a decay weight, and add_score is an amount of increase for each match of the hash address.

19. The non-transitory computer readable storage media of claim 15, further encoded with computer executable instructions that, when executed, cause the at least one processor to perform further actions comprising:
keeping data associated with the address in a cache, wherein the hotness score is tracked for read commands; and
adjusting the hotness threshold based at least in part on a cache hit rate distribution and a hot logical block addresses ratio distribution.

20. The non-transitory computer readable storage media of claim 15, further encoded with computer executable instructions that, when executed, cause the at least one processor to perform further actions comprising:
receiving an eviction command with an eviction address;
performing a k-iteration loop with k being a number of hash addresses in the set of hash addresses, and in each iteration of the k-iteration loop:
generating an eviction hash address for the eviction address;
obtaining a hotness score associated with the eviction hash address;
comparing the hotness score to an eviction threshold value;
ending the eviction process if the hotness score is smaller than the eviction threshold value; and recording the hotness score if the hotness score is larger than the eviction threshold value;

determining a minimum hotness score among k hotness scores recorded in the k-iteration loop; and reducing each of the k hotness scores recorded in the k-iteration loop by the minimum hotness score.

* * * * *